(12) United States Patent
Zhou et al.

(10) Patent No.: US 7,366,909 B2
(45) Date of Patent: Apr. 29, 2008

(54) DYNAMIC WAVELET FEATURE-BASED WATERMARK

(75) Inventors: Wengsheng Zhou, Los Angeles, CA (US); Phoom Sagetong, Los Angeles, CA (US)

(73) Assignee: The Boeing Company, Chicago, IL (US)

( * ) Notice: Subject to any disclaimer, the term of this patent is extended or adjusted under 35 U.S.C. 154(b) by 777 days.

(21) Appl. No.: 10/419,495

(22) Filed: Apr. 21, 2003

(65) Prior Publication Data

US 2003/0202660 A1 Oct. 30, 2003

Related U.S. Application Data

(60) Provisional application No. 60/376,092, filed on Apr. 29, 2002.

(51) Int. Cl.
*H04L 9/00* (2006.01)
*H04B 1/66* (2006.01)
*H04B 1/00* (2006.01)
*G06K 9/00* (2006.01)
*G06K 9/36* (2006.01)

(52) U.S. Cl. ............ 713/176; 375/240.19; 375/240.18; 382/100; 382/232

(58) Field of Classification Search ................ 713/176; 375/240.19, 240.18; 382/232, 100
See application file for complete search history.

(56) References Cited

U.S. PATENT DOCUMENTS 6,226,387 B1 * 5/2001 Tewfik et al. ............... 382/100
6,385,329 B1 * 5/2002 Sharma et al. .............. 382/100
6,556,689 B1 * 4/2003 Xia et al. .................... 382/100
6,714,683 B1 * 3/2004 Tian et al. ................... 382/240

(Continued)

FOREIGN PATENT DOCUMENTS

EP 0 746 126 A2 12/1996

(Continued)

OTHER PUBLICATIONS

Masataka Ejima and Akio Miyazaki; A Wavelet-Based Watermarking for Digital Images and Video Graduate School of Information Science and Electrical Engineering, Kyushu University 6-10- 1 Hakozaki, Higashi-ku, Fukuoka-shi, 8 12-858 1 Japan.*

(Continued)

*Primary Examiner*—Emmanuel L. Moise
*Assistant Examiner*—Techane J. Gergiso
(74) *Attorney, Agent, or Firm*—Gates & Cooper LLP

(57) ABSTRACT

A dynamic wavelet feature-based watermark for use with digital video. Scene change detection separates digital data into one or more scenes, wherein each of the scenes is comprised of one or more frames. A temporal wavelet transformation decomposes the frames of each scene into dynamic frames and static frames. The static frames of each scene are subjected to a spatial wavelet transformation, so that the watermark can be cast into middle frequency sub-bands resulting therefrom. Polyphase-based feature selection or local block-based feature selection is used to select one or more features. The watermark is cast into the selected features by means of either (1) a comparison of energy in polyphase transform components of the selected feature, or (2) a change in value of blocked wavelet coefficients of the selected feature.

44 Claims, 13 Drawing Sheets

U.S. PATENT DOCUMENTS

| | | | | |
|---|---|---|---|---|
| 6,934,403 | B2* | 8/2005 | Joo et al. | 382/100 |
| 6,956,568 | B2* | 10/2005 | Maekawa et al. | 345/420 |
| 6,957,350 | B1* | 10/2005 | Demos | 380/203 |
| 6,975,733 | B1* | 12/2005 | Choi et al. | 381/100 |

FOREIGN PATENT DOCUMENTS

| | | |
|---|---|---|
| EP | 0 798 892 A2 | 10/1997 |
| EP | 0 982 927 A1 | 3/2000 |

OTHER PUBLICATIONS

Ingemar J. Cox, et al., "Secure Spread Spectrum Watermarking for Multimedia", *IEEE Transactions On Image Processing*, vol. 6, No. 12, Dec. 1997, pp. 1673-1687.

Eckhard Koch, et al., "Copyright Protection for Multimedia Data", Fraunhofer Institute for Computer Graphics, Darmstadt, Germany, Dec. 16, 1994, pp. 1-15.

Mitchell D. Swanson, et al., "Multiresolution Scene-Based Video Watermarking Using Perceptual Models", *IEEE Journal On Selected Areas In Communications*, vol. 16, No. 4, May 1998, pp. 540-550.

Wensheng Zhou, et al., "On-line Scene Change Detection of Multicast Video", *IEEE Journal of Visual Communication and Image Representation*, vol. 12, Mar. 2001, pp. 1-16.

Jerome M. Shapiro, "Embedded Image Coding Using Zerotrees of Wavelet Coefficients", *IEEE Transactions on Signal Processing*, vol. 41, No. 12, Dec. 1993, pp. 3445-3462.

Amir Said, et al., "A New, Fast, and Efficient Image Codec Based On Set Partitioning In Hierarchical Trees", *IEEE Transactions On Circuits and Systems For Video Technology*, vol. 6, No. 3, Jun. 1996, pp. 243-250.

Raymond B. Wolfgang, et al., "Perceptual Watermarks for Digital Images and Video", *Proceedings of the IEEE*, vol. 87, No. 7, Jul. 1999, pp. 1108-1126.

Augot, D., et al., "Secure Delivery of Images Over Open Networks", Special issue on identification and protection of multimedia information, Proceedings of the IEEE, Jul. 1999, 87(7): 1251-1266.

Haitsma, J., et al., "A Watermarking Scheme For Digital Cinema", Proceedings of the International Conference On Image Processing, 'Online! Oct. 7-10, 2001, pp. 487-489, XP002249974 Thessaloniki.

Lin, C. Y., et al., "Rotation, Scale, and Translation Resilient Watermarking for Images", IEEE, Trans. On Image Processing, vol. 10, pp. 767-782, May 2001.

Pereira, S., et al., "Fast Robust Template Matching for Affine Resistant Image Watermarks", Proc. 3rd Int. Information Hiding Workshop, pp. 207-218, 1999.

Solachidis, V., et al., "Circularly Symmetric Watermark Embedding in 2-D DFT Domain", IEEE Trans. On Image Processing, vol. 10, pp. 1741-1753, Nov. 2001.

Stromberg, Michael, "Secure Content Protection: An Overview of the Proposed Security Mechanisms In Digital Cinema", KTH Advanced Media Technology Lab, 'Online! Sep. 20, 2001, XP002249975 Stockholm, retrieved from the Internet: URL:www.amt.kth.es on Aug. 1, 2003, 17 pages.

Kirovski et al., "Digital Rights Management for Digital Cinema," Inter. Symp. on Optical Science & Tech.—Security in Imaging: Theory & Applications, San Diego, CA, Jul. 2001, 16 pages.

National Association of Theatre Owners; "Digital Cinema User Requirements," Feb. 22, 2002, pp. 1-3.

Hose et al., "Data Transport and Processing in a Digital Cinema Theatre System," Qualcomm Incorporated from the 36th Advanced Motion Imaging Conference, Feb. 7-9, 2002, 21 pages.

\* cited by examiner

DYNAMIC WAVELET FEATURE-BASED WATERMARK

CROSS-REFERENCE TO RELATED APPLICATIONS

This application claims the benefit under 35 U.S.C. §119 (e) of co-pending and commonly-assigned U.S. Provisional Patent Application Serial No. 60/376,092, filed Apr. 29, 2002, by Wengsheng Zhou and Phoom Sagetong, and entitled "DYNAMIC WAVELET FEATURE-BASED WATERMARK APPARATUS AND METHOD FOR DIGITAL MOVIES IN DIGITAL CINEMA," which application is incorporated by reference herein.

This application is related to the following co-pending and commonly-assigned patent applications:

U.S. Utility patent application Ser. No. 10/419,490, filed on Apr. 21, 2003 by Isrnael Rodriguez, entitled WATERMARKS FOR SECURE DISTRIBUTION OF DIGITAL DATA. which application claims the benefit under 35 U.S.C. §119(e) of co-pending and commonly-assigned U.S. Provisional Patent Application Ser. No. 60/376,106, filed Apr. 29, 2002, by Ismael Rodriguez. entitled WATERMARK SCHEME FOR SECURE DISTRIBUTION OF DIGITAL IMAGES AND VIDEO, U.S. Utility patent application Ser. No. 10/419,491, filed on Apr. 21, 2003 by Ismael Rodriguez, entitled VISIBLE WATERMARK TO PROTECT MEDIA CONTENT FROM A SERVER TO PROJECTOR, which application claims the benefit under 35 U.S.C. §119(e) of commonly-assigned U.S. Provisional Patent Application Ser. No. 60/376,303, filed Apr. 29, 2002, by Ismael Rodriguez, entitled VISIBLE WATERMARK TO PROTECT MEDIA CONTENT FROM A SERVER TO PROJECTOR, and U.S. Utility patent application Ser. No. 10/419,489, filed on Apr. 21, 2003, by Troy Rockwood and Wengsheng Zhou, entitlcd NON-REPUDIATION WATERMARKING PROTECTION BASED ON PUBLIC AND PRIVATE KEYS, which application claims the benefit under 35 U.S.C. §119 (e) of co-pending and commonly-assigned U.S. Provisional Patent Application Ser. No. 60/376,212, filed Apr. 29, 2002, by Troy Rockwood and Wengsheng Zhou, entitled NON-REPUDIATION WATERMARKING PROTECTION APPARATUS AND METHOD BASED ON PUBLIC AND PRIVATE KEY, all of which applications are incorporated by reference herein.

BACKGROUND OF THE INVENTION

1. Field of the Invention

The invention relates to the field of digital watermarks, and more particularly, to a dynamic wavelet feature-based watermark.

2. Description of the Related Art (This application references publications and a patent, as indicated in the specification by a reference number enclosed in brackets, e.g., [x]. These publications and patent, along with their associated reference numbers, are identified in the section below entitled "References.")

With the recent growth of networked multimedia systems, techniques are needed to prevent (or at least deter) the illegal copying, forgery and distribution of media content comprised of digital audio, images and video. Many approaches are available for protecting such digital data, including encryption, authentication and time stamping.

One way to improve a claim of ownership over digital data, for instance, is to place a low-level signal or structure directly into the digital data. This signal or structure, known as a digital watermark, uniquely identifies the owner and can be easily extracted from the digital data. If the digital data is copied and distributed, the watermark is distributed along with the digital data. This is in contrast to the (easily removed) ownership information fields allowed by the MPEG-2 syntax.

Digital watermarking is an emerging technology. Several digital watermarking methods have been proposed.

For example, Cox et al. in [1] proposed and patented a digital watermark technology that is based on a spread spectrum watermark, wherein the watermark is embedded into a spread spectrum of video signals, such as Fast Fourier Transform (FFT) or Discrete Cosine Transform (DCT) coefficients.

Koch, Rindfrey and Zhao in [2] also proposed two general watermarks using DCT coefficients. However, the resulting DCT has no relationship to that of the image and, consequently, may be likely to cause noticeable artifacts in the image and be sensitive to noise.

A scene-based watermark has been proposed by Swanson, Zhu and Tewfik in [3]. In this method, each of a number of frames of a scene of video data undergoes a temporal wavelet transform, from which blocks are extracted. The blocks undergo perceptual masking in the frequency domain, such that a watermark is embedded therein. Once the watermark block is taken out of the frequency domain, a spatial mask of the original block is weighted to the watermark block, and added to the original block to obtain the watermarked block.

Regardless of the merits of prior art methods, there is a need for an improved watermark for digital data that prevents copying, forgery and distribution of media content. The present invention satisfies this need. More specifically, the goal of the present invention is to provide unique, dynamic and robust digital watermarks for digital data, in order to trace any compromised copies of the digital data.

SUMMARY OF THE INVENTION

The present invention discloses a dynamic wavelet feature-based watermark for use with digital video. Scene change detection separates the digital data into one or more scenes, wherein each of the scenes is comprised of one or more frames. A temporal wavelet transformation decomposes the frames of each scene into dynamic frames and static frames. The static frames of each scene are subjected to a spatial wavelet transformation, so that the watermark can be cast into middle frequency sub-bands resulting therefrom. Polyphase-based feature selection or local block-based feature selection is used to select one or more features. The watermark is cast into the selected features by means of either (1) a comparison of energy in polyphase transform components of the selected feature, or (2) a change in value of blocked wavelet coefficients of the selected feature.

BRIEF DESCRIPTION OF THE DRAWINGS

Referring now to the drawings in which like reference numbers represent corresponding parts throughout.

DETAILED DESCRIPTION OF THE INVENTION

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

1. Overview

The present invention discloses a dynamic wavelet feature-based watermark for use with digital video. Scene change detection is used to separate the digital data into one or more scenes, wherein each of the scenes is comprised of one or more frames. For each scene, a temporal wavelet transformation decomposes the frames of each scene into dynamic frames and static frames. The static frames are subjected to a spatial wavelet transformation, which generates all spatial sub-bands with different resolutions, so that the watermark can be cast or embedded in middle frequency sub-bands resulting therefrom. Polyphase-based feature selection or local block-based feature selection is used to identify one or more features for the casting of the watermark in the middle frequency sub-bands. The watermark is then cast into the selected features by means of either (1) a comparison of energy in polyphase transform components of the selected feature, or (2) a change in value of blocked wavelet coefficients of the selected feature. Watermarks created in this manner are unique, dynamic and robust.

2. Hardware Environment

Figure 1A:
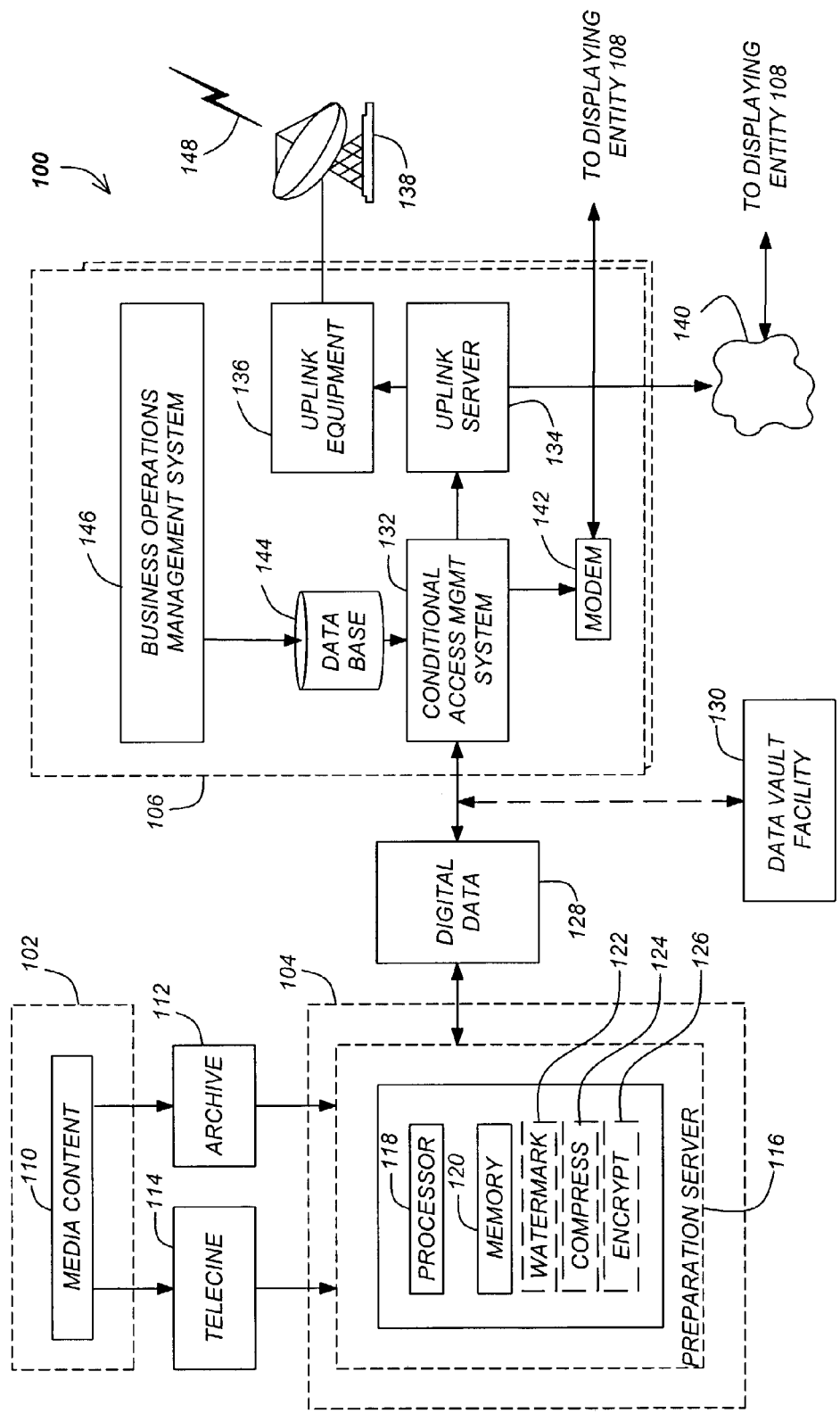
FIGS. 1A and 1B depict a top-level functional block diagram of one embodiment of a media content distribution system.
Figure 1B:
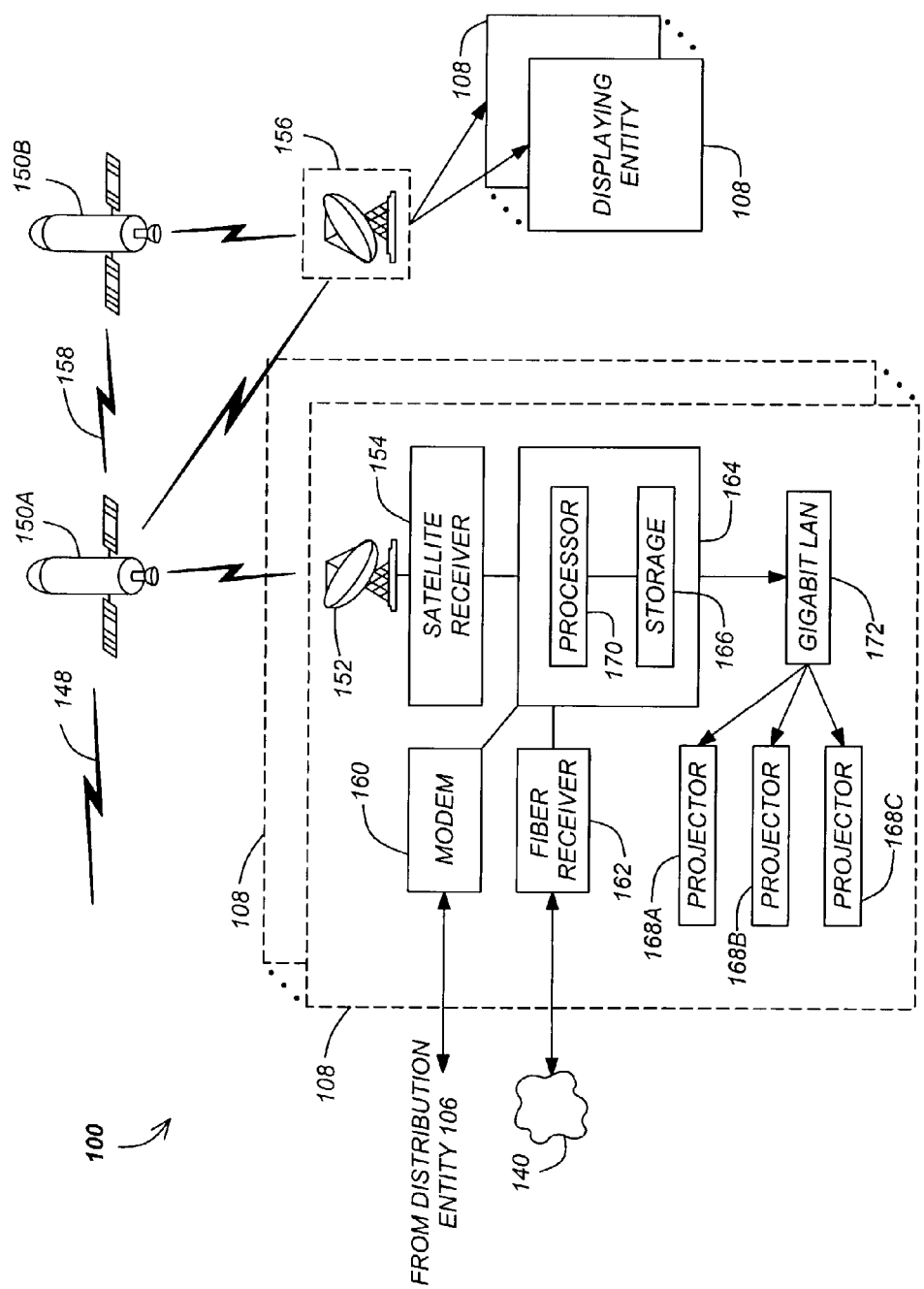

FIGS. 1A and 1B depict a top-level functional block diagram of one embodiment of a media content distribution system 100. The media content distribution system 100 comprises a content provider 102, a protection entity 104, a distribution entity 106 and one or more presentation/displaying entities 108. The content provider 102 provides media content 110 such as audiovisual material to the protection entity 104. The media content 110, which can be in digital or analog form, can be transmitted in electronic form via the Internet, by dedicated land line, broadcast, or by physical delivery of a physical embodiment of the media (e.g. a celluloid film strip, optical or magnetic disk/tape). Content can also be provided to the protection entity 104 from a secure archive facility 112.

The media content 110 may be telecined by processor 114 to format the media content as desired. The telecine process can take place at the content provider 102, the protection entity 104, or a third party.

The protection entity 104 may include a media preparation processor 116. In one embodiment, the media preparation processor 116 includes a computer system such as a server, having a processor 118 and a memory 120 communicatively coupled thereto. The protection entity 104 further prepares the media content 110. Such preparation may include adding protection to the media content 110 to prevent piracy of the media content 110. For example, the preparation processor 116 can perform a watermarking process 122, apply a compression process 124, and/or perform an encrypting process 126 on the media content 110 to protect it, resulting in output digital data 128. Thus, the output digital data 128 may contain one or more data streams that has been watermarked, compressed and/or encrypted.

Once prepared, the output digital data 128 can be transferred to the distribution entity 106 via digital transmission, tape or disk (e.g., CD-ROM, DVD, etc.). Moreover, the output digital data 128 can also be archived in a data vault facility 130 until it is needed.

Although illustrated as separate entities, the protection entity 104 can be considered as part of the distribution entity 106 in the preferred embodiment and is communicatively positioned between the content provider 102 and the distribution entity 106. This configuration ameliorates some of the security concerns regarding the transmission of the output digital data 128 between the protection entity 104 and the distribution entity 106. In alternative embodiments, however, the protection entity 104 could be part of the content provider 102 or displaying entity 108. Moreover, in alternative embodiments, the protection entity 104 could be positioned between the distribution entity 106 and the displaying entity 108. Indeed, it should be understood that the protection entity 104, and the functions that it performs, may be employed whenever and wherever the media content moves from one domain of control to another (for example, from the copyright holder to the content provider 102, from the content provider 102 to the distribution entity 106, or from the distribution entity 106 to the display entity 108).

The distribution entity 106 includes a conditional access management system (CAMS) 132, that accepts the output digital data 128, and determines whether access permissions are appropriate for the output digital data 128. Further, CAMS 132 may be responsible for additional encrypting so that unauthorized access during transmission is prevented.

Once the output digital data 128 is in the appropriate format and access permissions have been validated, CAMS 132 provides the output digital data 128 to an uplink server 134, ultimately for transmission by uplink equipment 136 to one or more displaying entities 108, as shown in FIG. 1B. This is accomplished by the uplink equipment 136 and uplink antenna 138.

In addition or in the alternative to transmission via satellite, the output digital data 128 can be provided to the displaying entity 108 via a forward channel fiber network 140. Additionally, the output digital data may be transmitted to displaying entity 108 via a modem 142 using, for example a public switched telephone network line. A land based communication such as through fiber network 140 or modem 142 is referred to as a back channel. Thus, information can be transmitted to and from the displaying entity 108 via the back channel or the satellite network. Typically, the back channel provides data communication for administration functions (e.g. keys, billing, authorization, usage tracking, etc.), while the satellite network provides for transfer of the output digital data 128 to the displaying entities 108.

The output digital data 128 may be securely stored in a database 144. Data is transferred to and from the database 144 under the control and management of the business operations management system (BOMS) 146. Thus, the BOMS 146 manages the transmission of information to 108, and assures that unauthorized transmissions do not take place.

Referring to FIG. 1B, the data transmitted via uplink 148 is received in a satellite 150A, and transmitted to a downlink antenna 152, which is communicatively coupled to a satellite or downlink receiver 154.

In one embodiment, the satellite 150A also transmits the data to an alternate distribution entity 156 and/or to another satellite 150B via crosslink 158. Typically, satellite 150B services a different terrestrial region than satellite 150A, and transmits data to displaying entities 108 in other geographical locations.

A typical displaying entity 108 comprises a modem 160 (and may also include a fiber receiver 158) for receiving and transmitting information through the back channel (i.e., via an communication path other than that provided by the satellite system described above) to and from the distribution entity 106. For example, feedback information (e.g. relating to system diagnostics, keys, billing, usage and other administrative functions) from the exhibitor 108 can be transmitted through the back channel to the distribution entity 106. The output digital data 128 and other information may be accepted into a processing system 164 (also referred to as a content server). The output digital data 128 may then be stored in the storage device 166 for later transmission to displaying systems (e.g., digital projectors) 168A-168C. Before storage, the output digital data 128 can be decrypted to remove transmission encryption (e.g. any encryption applied by the CAMS 132), leaving the encryption applied by the preparation processor 116.

When the media content 110 is to be displayed, final decryption techniques are used on the output digital data 128 to substantially reproduce the original media content 110 in a viewable form which is provided to one or more of the displaying systems 168A-168C. For example, encryption 126 and compression 124 applied by the preparation processor 118 is finally removed, however, any latent modification, undetectable to viewers (e.g., the results from the watermarking process 122) is left intact. In one or more embodiments, a display processor 170 prevents storage of the decrypted media content 110 in any media, whether in the storage device 166 or otherwise. In addition, the media content 110 can be communicated to the displaying systems 168A-168C over an independently encrypted connection, such as on a gigabit LAN 172.

Generally, each of the components of the system 100 comprise hardware and/or software that is embodied in or retrievable from a computer-readable device, medium, signal or carrier, e.g., a memory, a data storage device, a remote device coupled to another device, etc. Moreover, this hardware and/or software perform the steps necessary to implement and/or use the present invention. Thus, the present invention may be implemented as a method, apparatus, or article of manufacture.

Of course, those skilled in the art will recognize that many modifications may be made to the configuration described without departing from the scope of the present invention. Specifically, those skilled in the art will recognize that any combination of the above components, or any number of different components, may be used to implement the present invention, so long as similar functions are performed thereby.

3. Dynamic Wavelet Feature-Based Watermarks

Figure 2:
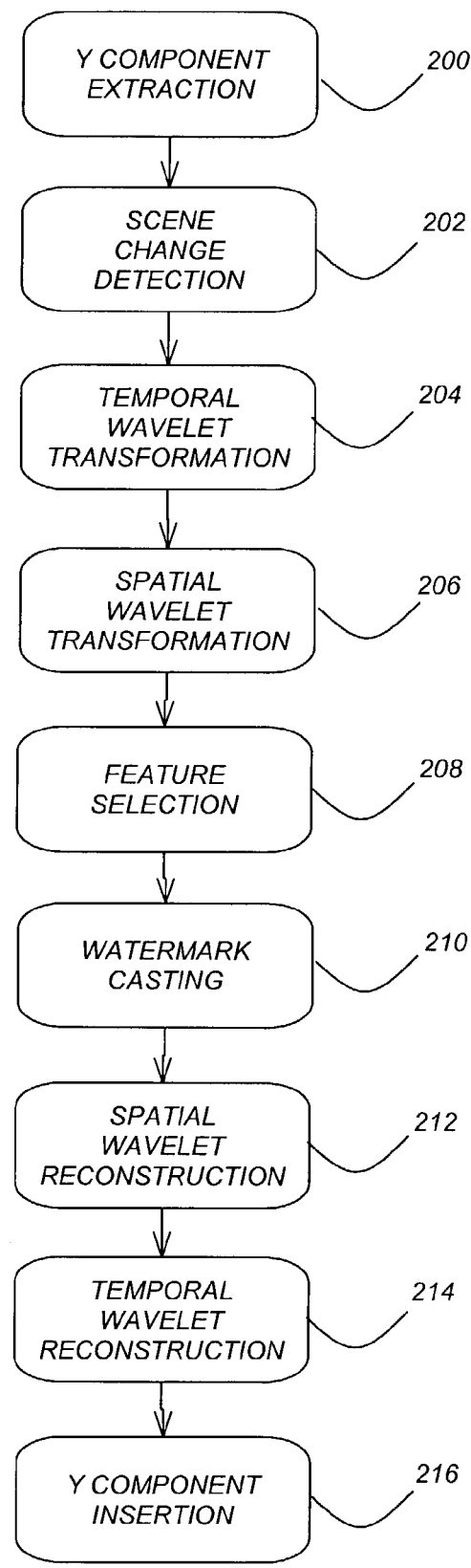
FIG. 2 is a flowchart illustrating the functions performed by the watermarking process in embedding a dynamic wavelet feature-based watermark in the media content according to the preferred embodiment of the present invention.

FIG. 2 is a flowchart illustrating the functions performed by the watermarking process 122, or other entity, in casting or embedding a dynamic wavelet feature-based watermark in the media content 110 according to the preferred embodiment of the present invention.

In the preferred embodiment, the media content 110 is comprised of digital video. Block 200 represents the watermarking process 122 extracting a Y (luminance) component of a Y, U(Cb), V(Cr) digital data stream representing the color components of the digital video. This extracted Y component comprises the digital data for the scene change detection.

Block 202 represents the watermarking process 122 performing a scene change detection to segment the digital data into one or more scenes, wherein each scene is comprised of one or more frames. A method for scene change detection is described by Zhou et al. in [4]. Preferably, the watermarking process 122 casts a single watermark across all the frames in a scene, on a scene-by-scene basis. To avoid averaging and collusion attacks at the frames near a scene boundary, the watermarking process 122 will generally cast different watermarks in neighboring scenes. On the other hand, some or all of a watermark may be repeated in different scenes in order to make the watermark more robust (e.g., watermark detection could then be based on multiple copies of the watermark and a "majority decision" on whether the watermark had been detected).

Block 204 represents the watermarking process 122 performing a temporal wavelet transformation to decompose the frames of each scene into dynamic frames and static frames.

Block 206 represents the watermarking process 122 performing a spatial wavelet transformation of the static frames of each scene, which generates a plurality of spatial sub-bands with different resolutions, so that the watermark can be cast in middle frequency sub-bands resulting therefrom.

Block 208 represents the watermarking process 122 performing either polyphase-based feature selection or local block-based feature selection, which are used to identify one or more features for the casting of the watermark in the middle frequency sub-bands of the static frames. In the preferred embodiment, the features comprise either polyphase transform components or blocked wavelet coefficients. In alternative embodiments, the selected features may include, inter alia, colors, object shapes, textures, etc., or some other characteristic that identifies one or more locations for embedding the watermark in the frames of each of the scenes.

Block 210 represents the watermarking process 122 casting the watermark into the selected features of each of the scenes by means of either (1) a comparison of energy in polyphase transform components of the selected feature, or (2) a change in value of blocked wavelet coefficients of the selected feature.

Block 212 represents the watermarking process 122 performing a spatial wavelet reconstruction to reconstruct the static frames with the cast watermark of each scene. The spatial wavelet reconstruction comprises a spatial inverse-wavelet transformation.

Block 214 represents the watermarking process 122 performing a temporal wavelet reconstruction to recombine the dynamic frames with the static frames with the cast watermark to recreate each scene. The temporal wavelet reconstruction comprises a temporal inverse-wavelet transformation.

Block 216 represents the watermarking process 122 concatenating the recreated scenes and inserting the Y component resulting therefrom into the Y, U(Cb), V(Cr) digital data stream representing the color components of the digital video.

3.1. Raw Y, U, V Color Components

As noted above, the watermarking process 122 uses only the Y component of the Y, U(Cb), V(Cr) digital data stream representing the color components of the digital video. In the preferred embodiment, only the Y component is used, because, while the U(Cb) and V(Cr) components have low effects on the visual quality of a video, they are easily destroyed by compression, such as MPEG compression. In other embodiments, it is expected that watermark redundancy may be introduced in the U(Cb) and V(Cr) components.

3.2. Scene Change Detection

In performing the scene change detection, the watermarking process 122 compares a histogram of each frame to histograms for adjacent frames in order to detect the boundary of a scene. Two methods of scene change detection can be used, as described by Zhou et al. in [4].

The first method, shown in Equation (1) below, computes a normalized difference in histograms between consecutive frames, wherein sim(i) is the similarity of the ith frame to its next frame, $hist_j^i$ is the histogram value at pixel value j of the ith frame, and FN is the total number of frames in the digital video. This value of sim(i) should be close to "0" when there is a high similarity between two frames. If an experimental threshold for sim(i) is set at "0.4" or less, the boundary between new scenes is detected with satisfactory accuracy.

$$sim(i) = \frac{\sum_{j=0}^{255} |hist_j^i - hist_j^{i+1}|}{\sum_{j=0}^{255} hist_j^i}; i = 1, \ldots, FN \quad (1)$$

The second method is to use the minimum number of histograms of two consecutive frames and normalize the summation by the total number of pixels per frame, as shown in Equation (2) below, where the min(x,y) is equal to x if x<y, and otherwise it is equal to y. The value of sim(i) is expected to be close to "1" when there is a high similarity between any two consecutive frames. If an experimental threshold is set to be "0.7," the boundary between new scenes is detected with satisfactory accuracy.

$$sim(i) = \frac{\sum_{j=0}^{255} \min(hist_j^i - hist_j^{i+1})}{\sum_{j=0}^{255} hist_j^i}; i = 1, \ldots, FN \quad (2)$$

After the digital video has been separated into scenes, temporal and spatial wavelet transformations are performed.

3.3. Temporal and Spatial Wavelet Transformations

As noted above, the watermarking process 122 performs a temporal wavelet transformation to decompose each scene into static frames and dynamic frames. Static frames are obtained by applying a wavelet low-pass filter along a temporal domain and sub-sampling the filtered frames by 2 (or some other value), while dynamic frames are obtained by applying a wavelet high-pass filter along a temporal domain and sub-sampling the filtered frames by 2 (or some other value). In one example, a 144-frame video sequence, after temporal wavelet decomposition, resulted in 9 static frames and 135 dynamic frames.

Figure 3:
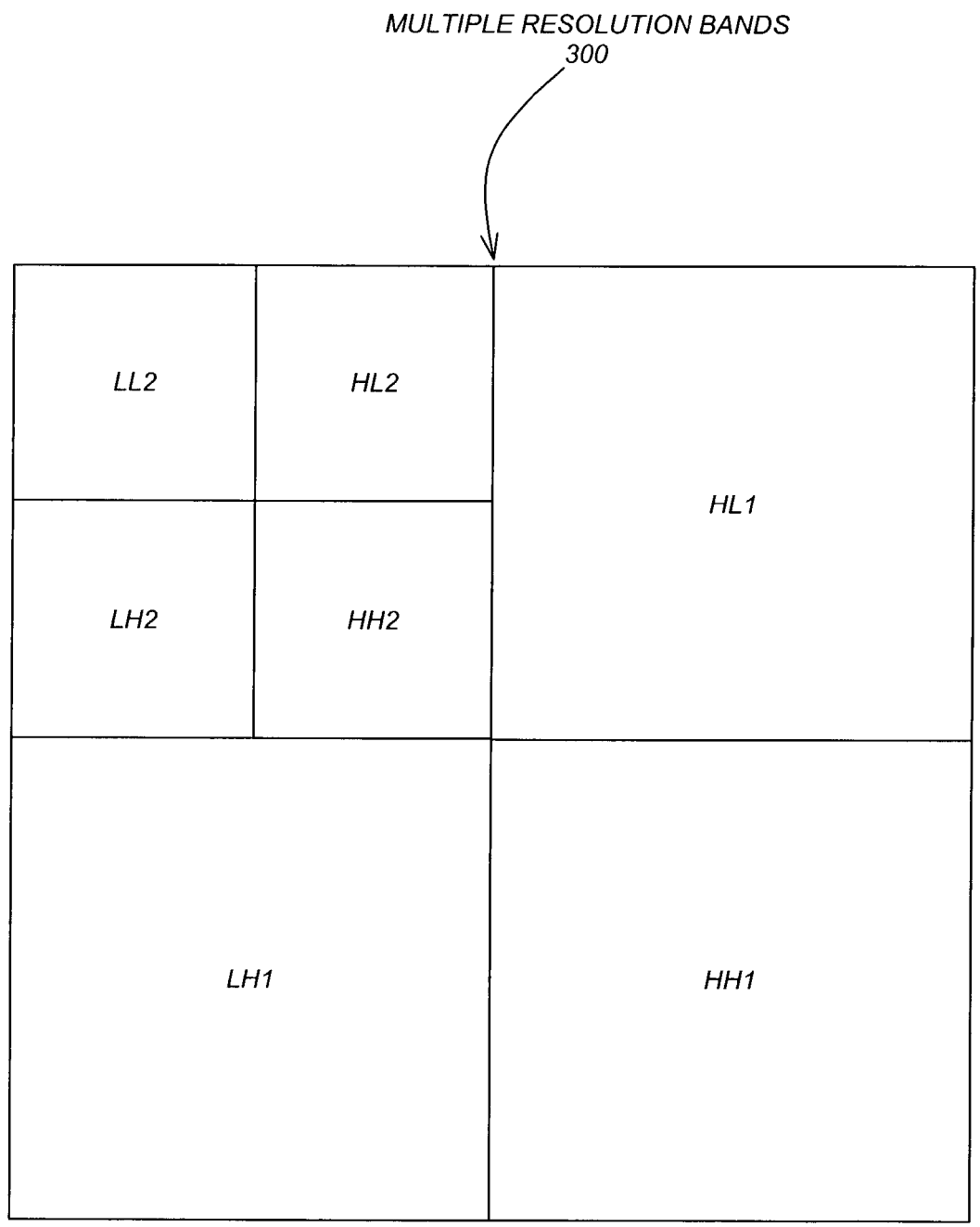
FIG. 3 is a diagram that illustrates the multiple resolution bands that result after performing the spatial wavelet decomposition.

The watermarking process 122 then performs a spatial wavelet transformation on the static frames of each scene. FIG. 3 is a diagram that illustrates the multiple resolution bands 300 that result after performing the spatial wavelet transformation. In the example of FIG. 3, two levels of spatial wavelet transformation yields 7 sub-bands, i.e., LL2, LH2, HL2, HH2, LH1, HL1 and HH1. The sub-band LL2 represents the approximation of the static frame that contains the most important data, while the other bands LH2, HL2, HH2, LH1, HL1 and HH1 contain high frequency information, such as the edge information of each static frame.

In the preferred embodiment, the watermarking process 122 casts the watermark in the middle frequency bands, e.g., HL2, HH2 and LH2, of the static frames, as a tradeoff between the robustness of watermark and the visual quality of the digital video. For example, in the spatial domain, the LL2 sub-band contains the most important information, and thus any modification there would sacrifice visual quality of the digital video. On the other hand, a watermark cast into the HH1I sub-band could be removed by re-compressing the digital video with a high compression ratio. Hence, the watermarking process 122 casts the watermark in the middle frequency bands, e.g., HL2, HH2 and LH2, to establish a tradeoff between the robustness of watermark and the visual quality of the video sequence.

3.4. Watermark Casting

The watermarking process 122 can cast the watermark into any of the features of the middle frequency bands of the static frames. In one embodiment, the watermarking process 122 uses a simple feature, such as (1) a comparison of energy in polyphase transform components of the selected feature, or (2) a change in value of blocked wavelet coefficients of the selected feature, although other features could be used as well.

3.4.1. Polyphase-Based Feature Selection

Polyphase-based feature selection, i.e., a polyphase transformation, may be used by the watermarking process 122 to determine where to cast the watermark. Specifically, the watermarking process 122 considers one pixel at the LL2 sub-band as one root of a tree, wherein each root of the tree has its children along all the other sub-bands.

Figure 4:
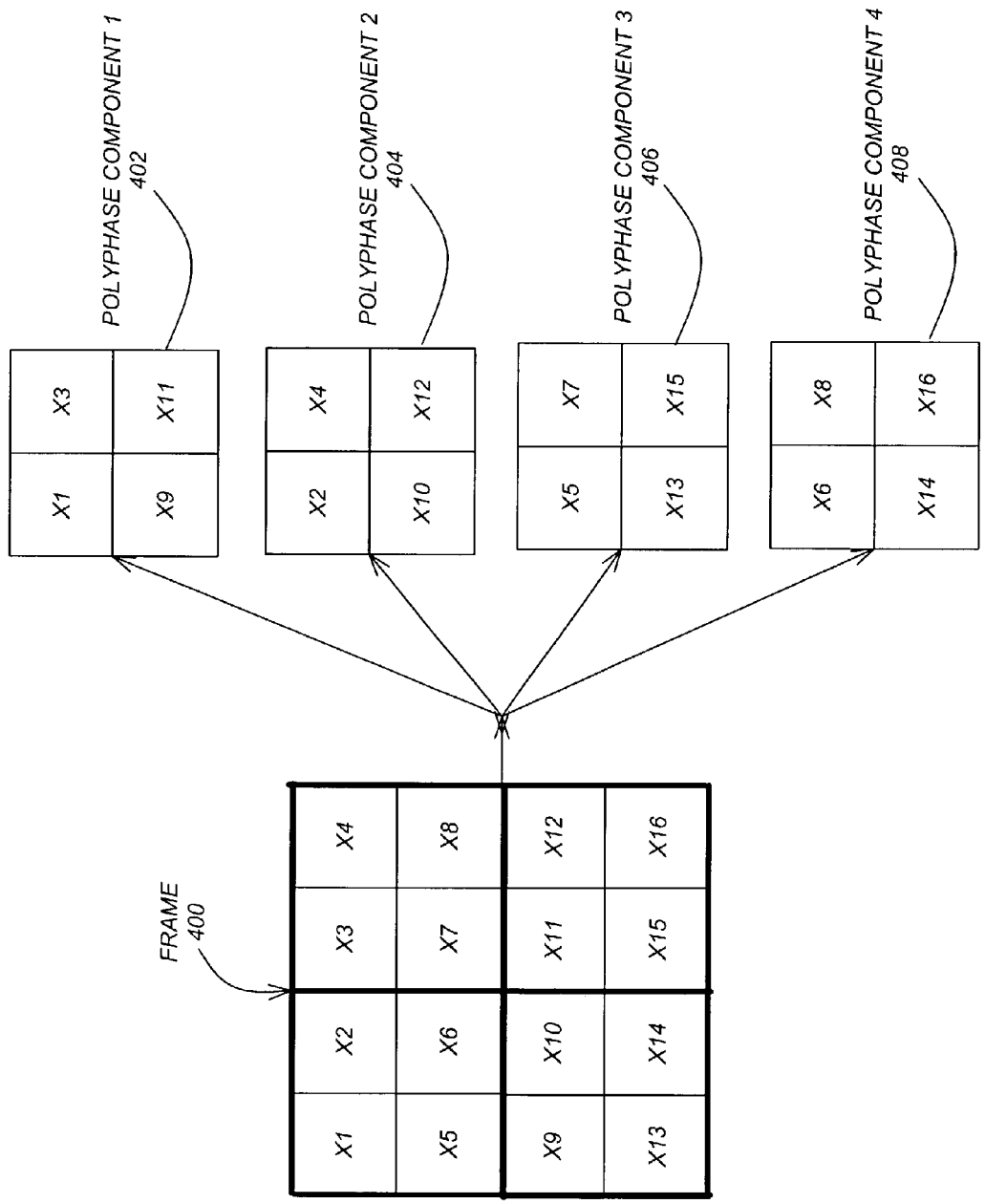
FIG. 4 illustrates a polyphase transformation on a frame.

Consider the example of FIG. 4, which illustrates a polyphase transformation on a frame 400 having a size of 4×4 pixels, which is segmented into four blocks 402, 404, 406, 408, each having a size 2×2 pixels, wherein Xi represents the ith pixel, i=1, 2, . . . , 16, from a frame 400 having a total of 16 pixels. The pixels are grouped into the four blocks 402, 404, 406, 408, comprising the polyphase transform components, according to their location in the frame 400. This is a zero-tree structure used in wavelet image coders, such as described by Shapiro in [5] and by Said et al. in [6].

The watermarking process 122 then applies the polyphase transformation to each of the selected sub-bands HL2, HH2 and LH2. The polyphase transformation sub-samples the wavelet coefficients in row and column directions into multiple polyphase transform components. Each component will eventually have approximately the same characteristics. This provides approximately the same energy in each polyphase transform component.

Next, the components are paired up. For example, for a frame size of 144×176 pixels, after a 2-level decomposition, there will be 1,584 trees. If the HH2 sub-band is split into 16 components, each component has a size of 9×11. After pairing up the 16 components, 8 pairs are constructed, wherein each pair represents one watermark bit.

If it is desired to cast a watermark bit "1", the watermarking process 122 establishes the rule that the energy of an odd-indexed component must be greater than the energy of its neighboring even-indexed components. To guarantee that the inequality still exists, even after attack, all the coefficients belonging to the component are expected to have less energy, e.g., the coefficients of the even-indexed component are truncated to be zero.

If it is desired to cast a watermark bit "0", the watermarking process 122 performs the same process in the opposite direction. That is, the watermarking process 122 invention zeros the coefficients of the odd-indexed components.

Pursuing inequality in this way on the watermark bits for each pair, 8 bits of the watermark may be cast into each static frame. The members of the trees in sub-bands HL2 and LH2 corresponding to those in the HH2 sub-band are subjected to the same process.

3.4.2. Local Block-Based Feature Selection

The polyphase-based feature selection described above works well for temporal-domain attacks. However, it fails to survive spatial domain attacks, such as sub-sampling of frames. Consequently, a local block-based feature selection, i.e., a change in value of blocked wavelet coefficients, may be used by the watermarking process 122 to determine where to embed the watermark, in order to resist attacks in the spatial domain.

Figure 5:
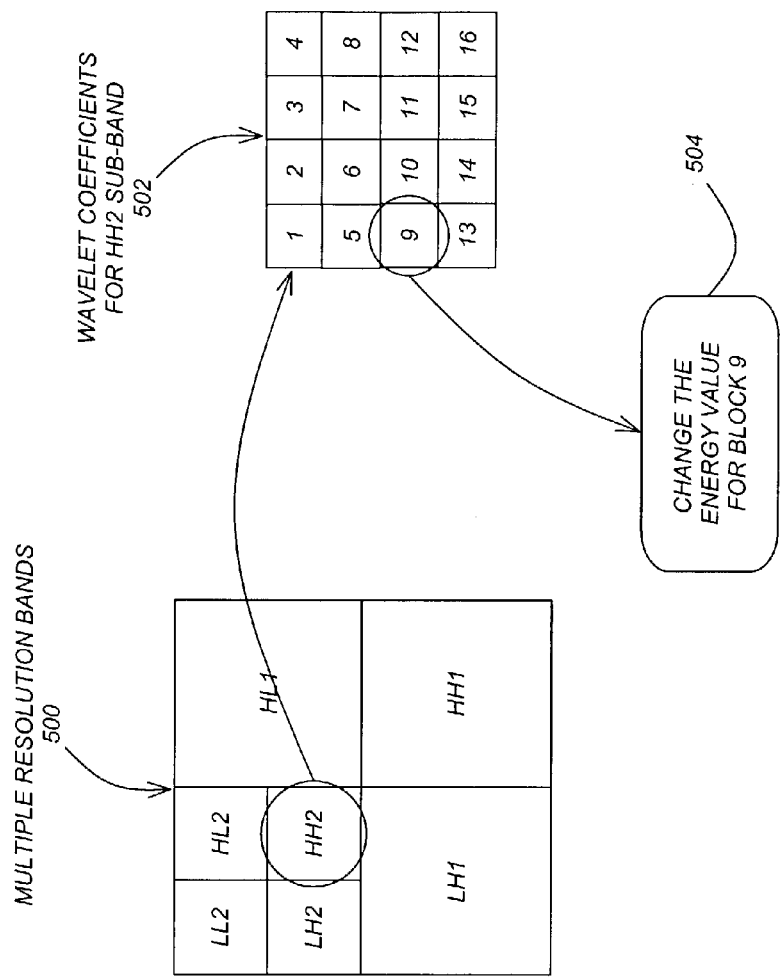
FIG. 5 is a diagram that illustrates how watermark casting is performed based on the local block-based feature selection according to the preferred embodiment of the present invention.

FIG. 5 is a diagram that illustrates how watermark casting is performed based on the local block-based feature selection according to the preferred embodiment of the present invention.

Instead of constructing the polyphase transform components and pairing two of them to cast one watermark bit, the watermarking process 122 selects the middle frequency spatial sub-bands, i.e., HL2, HH2, and LH2, of the multiple resolution bands 500, and for each of these selected sub-bands, locally separates the wavelet coefficients nearby into a corresponding block 502 without performing sub-sampling.

The watermarking process 122 uses a classic embedding procedure of adding noise into the frame (as described by Wolfgang et al. in [7], for example) for the insertion of the watermark. However, in contrast to [7], the watermarking process 122 changes the value of the energy of the wavelet coefficients of the selected sub-bands, as indicated by Block 504.

For the ith selected sub-band, the energy of each block, $E_{ij}^0$ for the jth block, is modified as shown in Equation (3) below to be the watermarked energy $E_{ij}^w$, where $\alpha$ is watermark strength and the $b_j$ is the jth watermark bit, which is either 0 or 1:

$$E_{ij}^w = E_{ij}^0(1 + \alpha b_j) = E_{ij}^0 + E_{ij}^0 \alpha b_j \qquad (3)$$

At the ith selected sub-band, since the energy is the summation of the square of the amplitudes of the wavelet coefficients:

$$E_{ij}^0 = \sum_{k=1}^{N_i} |x_{ijk}^0|^2 \text{ and}$$

$$E_{ij}^w = \sum_{k=1}^{N_i} |x_{ijk}^w|^2$$

where $N_i$ is the total number of wavelet transformed coefficients in one block that belongs to the ith selected sub-band, and $x_{ijk}^0$ and $x_{ijk}^w$, at the kth selected sub-band, are the kth wavelet coefficients in the jth original block and the jth watermarked block, respectively. Then, an original coefficient can be modified linearly to obtain a watermarked coefficient as shown in Equation (4):

$$x_{ijk}^w = \left(\sqrt{1 + \alpha b_j}\right) x_{ijk}^0 \qquad (4)$$

As noted above, the watermarking process 122 only casts the watermark bits into the middle frequency bands of LH1, HL1 and HH2.

4. Watermark Detection

To detect the watermark, the content provider 102 repeats the steps performed by the watermarking process 122 as described in FIG. 2 above, i.e., Y component extraction, scene change detection, temporal wavelet decomposition, spatial wavelet decomposition, and feature selection, using the watermarked media content 110.

Figure 6:
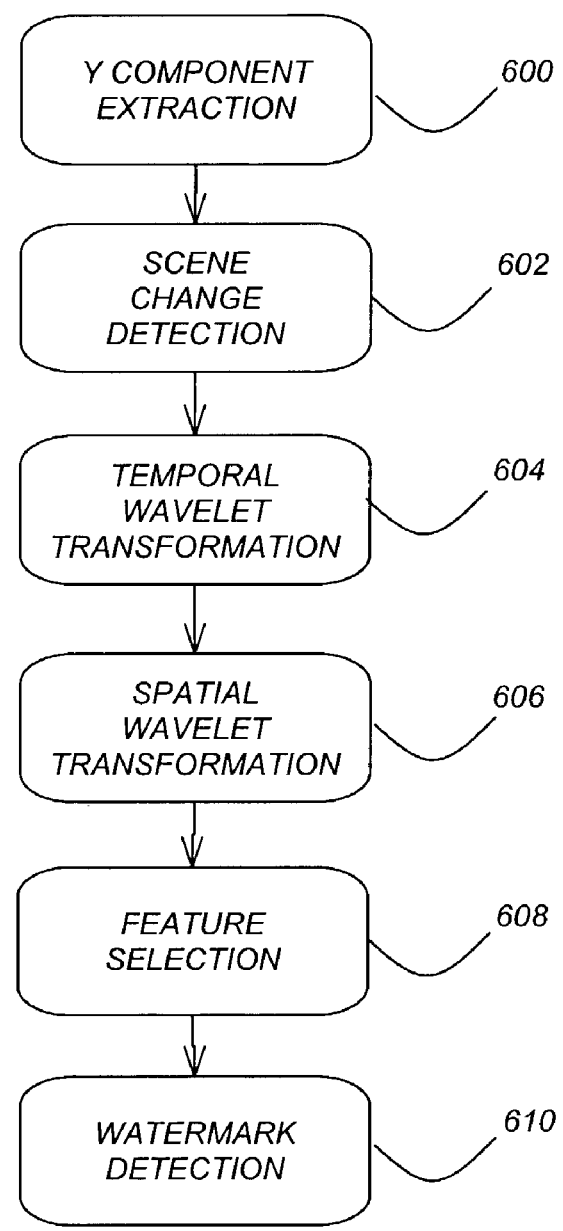
FIG. 6 is a flowchart illustrating the functions performed in detecting the dynamic wavelet feature-based watermark in the watermarked media content according to the preferred embodiment of the present invention.

FIG. 6 is a flowchart illustrating the functions performed by the content provider 102, or other entity, in detecting the dynamic wavelet feature-based watermark in the watermarked media content 110 according to the preferred embodiment of the present invention.

In the preferred embodiment, the watermarked media content 110 is comprised of digital video. Block 600 represents the content provider 102 extracting a Y component of a Y, U(Cb), V(Cr) digital data stream representing the color components of the digital video, as the digital data for the scene change detection.

Block 602 represents the content provider 102 performing a scene change detection to segment the digital data into one or more scenes, wherein each scene is comprised of one or more frames. As noted above, a method for scene change detection is described in [4]. Preferably, a single watermark is cast across all the frames in a scene, on a scene-by-scene basis. However, to avoid averaging and collusion attacks at the frames near a scene boundary, different watermarks will generally be embedded in neighboring scenes.

Block 604 represents the content provider 102 performing a temporal wavelet transformation to decompose the frames of each scene into dynamic frames and static frames.

Block 606 represents the content provider 102 performing a spatial wavelet transformation on the static frames of each scene, which generates all spatial sub-bands with different resolutions, wherein the watermark is cast into the middle frequency sub-bands resulting therefrom.

Block 608 represents the content provider 102 using either a polyphase-based feature selection or local block-based feature selection to identify one or more features for the casting of the watermark in the middle frequency sub-bands. In the preferred embodiment, the features comprise either polyphase transform components or blocked wavelet coefficients. In alternative embodiments, the features may include, inter alia, color, object shapes, textures, etc., or other characteristics that identify locations for casting the watermark in the frames of each of the scenes.

Block 610 represents the content provider 102 retrieving the candidate watermark from the selected features of each of the scenes by means of either (1) a comparison of energy in polyphase transform components of the selected feature, or (2) a change in value of blocked wavelet coefficients of the selected feature.

The content provider 102 iteratively performs these steps in an attempt to extract a watermark key using the location information provided it by the distribution entity 106. After a candidate watermark key is extracted, an attempt is made to verify the key by decrypting the key with the public key provided by the distribution entity 106 and then comparing the candidate watermark key with the nonce provided to the distribution entity 106 at the start of the initial exchange. If the candidate watermark key matches the nonce, the watermark has been successfully identified.

If polyphase-based feature selection was used to cast the watermark, then the polyphase transform components are constructed, identified and paired up, and the content provider 102 computes the energies and performs a comparison as described above. For each pair, if the energy of the even-indexed component is greater than that for the odd numbered one, then the content provider 102 has detected the watermark bit "0"; otherwise, the content provider 102 has detected the watermark bit "1".

For the local block-based feature selection at the ith selected sub-band, the gap in energy between casting or not casting a watermark bit is the range between 0 and $E_{ij}^0 \alpha$, because casting bit $b_j$ to be "0" means that the watermarking process 122 left the coefficient in the jth block unchanged, while casting bit $b_j$ to be "1" means that the watermarking process 122 increased the energy of the jth block by $E_{ij}^0 \alpha$. Therefore, the threshold is set to be somewhere between these two ends, i.e., $E_{ij}^0 \beta$ where $\beta$ is a parameter that can be adjusted to represent the appropriate threshold. The result is that, to detect whether 0 or 1 is the casting bit, the content provider 102 need only to check the difference between the watermarked (and probably attacked) energy and the original energy, and compare this difference with the threshold to make the decisions as shown below:

$$E_{ij}^w - E_{ij}^0 \geq \frac{E_{ij}^0 \alpha}{\beta} : \text{embedded watermark bit} = 1 \quad (5)$$

$$E_{ij}^w - E_{ij}^0 < \frac{E_{ij}^0 \alpha}{\beta} : \text{embedded watermark bit} = 0$$

The content provider 102 performs the same process repeatedly until all the bits of the watermark in every static frame have been detected. Furthermore, the content provider 102 repeats the same process for every scene in the digital video to identify all the watermarks cast in the scenes of the digital vide.

Note that the content provider 102 makes each watermark bit decision based upon the majority of outcomes among all scenes. It is worth noting that, as described, the watermark detection method does not need to use the original digital video to detect the watermark bit; in so-called oblivious watermarking, this only depends upon passing the original feature values to the watermark detection method. This is very useful when a trusted third party does not exist in the security-system point of view.

5. Experimental Results and Discussion

In experiments, the watermark was simulated on a test sequence of 144 frames, which was assumed to be one scene of the digital video. Each frame had a size of 144×176. Then, a 4-level temporal wavelet decomposition and 2-level spatial wavelet decomposition was applied. Finally, the experiment was categorized into multiple sections based on the reducing visual quality and robustness.

5.1. Visual Quality

Using the polyphase-based feature selection, it was decided to put 8 watermark bits in each static frame. For all the 9 static frames taken together, the watermark payload was 72 bits. (The minimum requirement from the security system for a watermark payload is at least 56 bits.) The average Peak Signal to Noise Ratio (PSNR) was used as a measurement of the objective performance of the visual quality after the watermark embedding or after experiencing attack. With the described numerical parameters, the quality of a watermarked sequence was at 44.23 dB, which was very pleasantly smooth when visually displayed.

Figure 7:
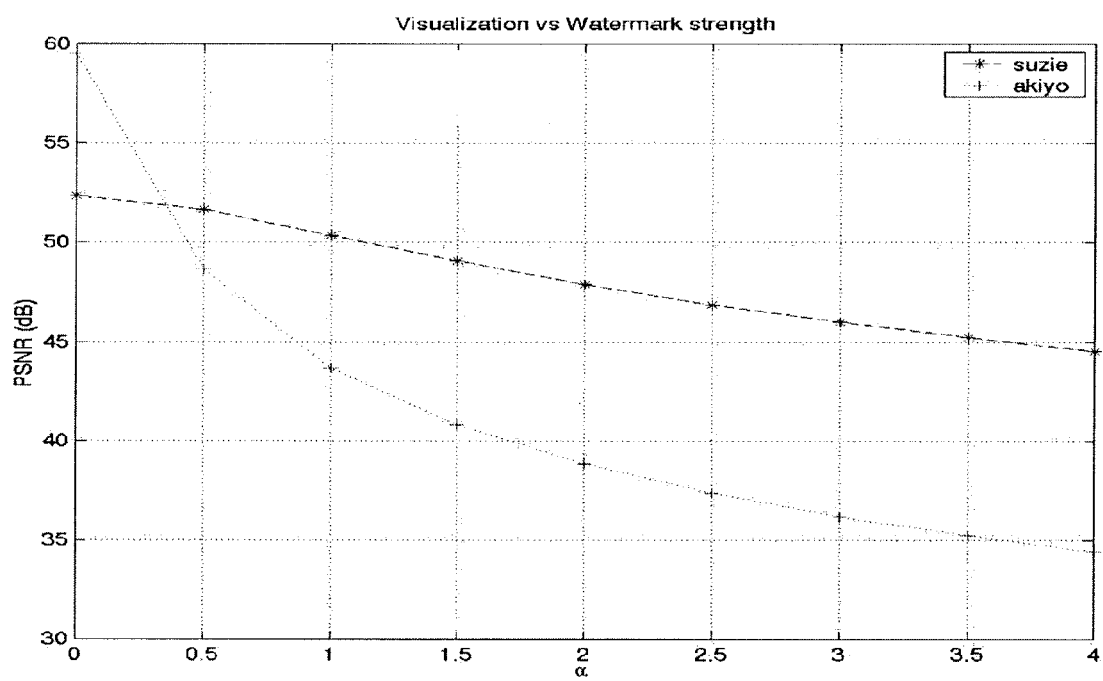
FIG. 7 is a graph illustrating the visual quality at different watermark strengths when 16-bits of watermark is cast.

For the local block-based feature selection, the experiment was performed under the same environment. FIG. 7 is a graph illustrating the visual quality at different watermark strengths when 16-bits of watermark is cast. The differences were that the strength of the watermark penetration was changed based on the parameter a and the average PSNR was plotted for both the "suzie" and "akiyo" sequences. As expected, the higher the strength of the watermark casting, the worse the video quality. This is the tradeoff between robustness and visual quality, which means that an appropriate watermark strength needs to be selected, so as not to compromise the visual requirements excessively.

It is worth noting that the upper bound of occurring distortion can be approximated from the fact that the difference between the modified coefficients and the original coefficients can be simplified in closed form as shown in Equation (4); if all the watermark bits are "1", that means the energy of each block has to be increased. This is the case of maximum degree of modification. All the wavelet coefficients in the selected sub-bands (i.e., LH1, HL1 and HH2) will be modified to increase on the order of $$x_{ijk}^w - x_{ijk}^0 = \left(\sqrt{1 + \alpha b_j} - 1\right) x_{ijk}^0 \quad (6)$$

$$= \left(\sqrt{1 + \alpha} - 1\right) x_{ijk}^0 \quad (7)$$

Therefore, the Mean Square Error (MSE) can be approximated to be $$MSE = \frac{\left(\sum_{i=0}^{N_b}\left(\sum_{j=0}^{N_w}(\sqrt{1+\alpha}-1)^2\sum_{k=0}^{N_i}|x_{ijk}^0|^2\right)\right)}{N_b \times N_w \times \sum_{i=0}^{N_b} N_i} \quad (8)$$

$$= (\sqrt{1+\alpha}-1)^2 \frac{\left(\sum_{i=0}^{N_b}\left(\sum_{j=0}^{N_{w2}}\sum_{k=0}^{N_i}|x_{ijk}^0|^2\right)\right)}{N}$$

$$= (\sqrt{1+\alpha}-1)^2 E^0$$

where $N_b$ is the number of selected sub-bands, $N_w$ is the number of watermark bits, $N_i$ is the total number of wavelet coefficients for one block of the ith selected sub-band, N is the total number of wavelet coefficients in all selected sub-bands, and, finally, $E^0$ is the average original energy of all selected sub-bands. From Equation (8), it can be seen that if the average original energies of all the selected sub-bands are available, we can determine an approximation of the objective quality, MSE or PSNR. This approximate relationship between the MSE and the watermark strength will be highly useful as a tradeoff between the quality of a watermarked digital video and the robustness of the watermarks since different watermark strength can be determined based on the particular characteristics of the embedding scene.

5.2. Robustness Against MPEG Re-Compression

Under the same environment described previously, MPEG re-compression was applied to the watermarked test sequence at different bit rates and the attacked sequence sent to the watermark detector. For the polyphase-based feature selection, the cast watermark bits can tolerate re-compression up to 288 kbps without any single error in a watermark bit. There is one bit of error introduced out of all 72 bits at 144 kbps re-compression. However, at such low bit rates as 144 kbps or 288 kbps, several annoying evidences of blocking appeared on the video frames. Thus, these types of digital video can not be counted as acceptable ones, and these kinds of pirated copies of digital videos can be ignored in practice.

Figure 8:
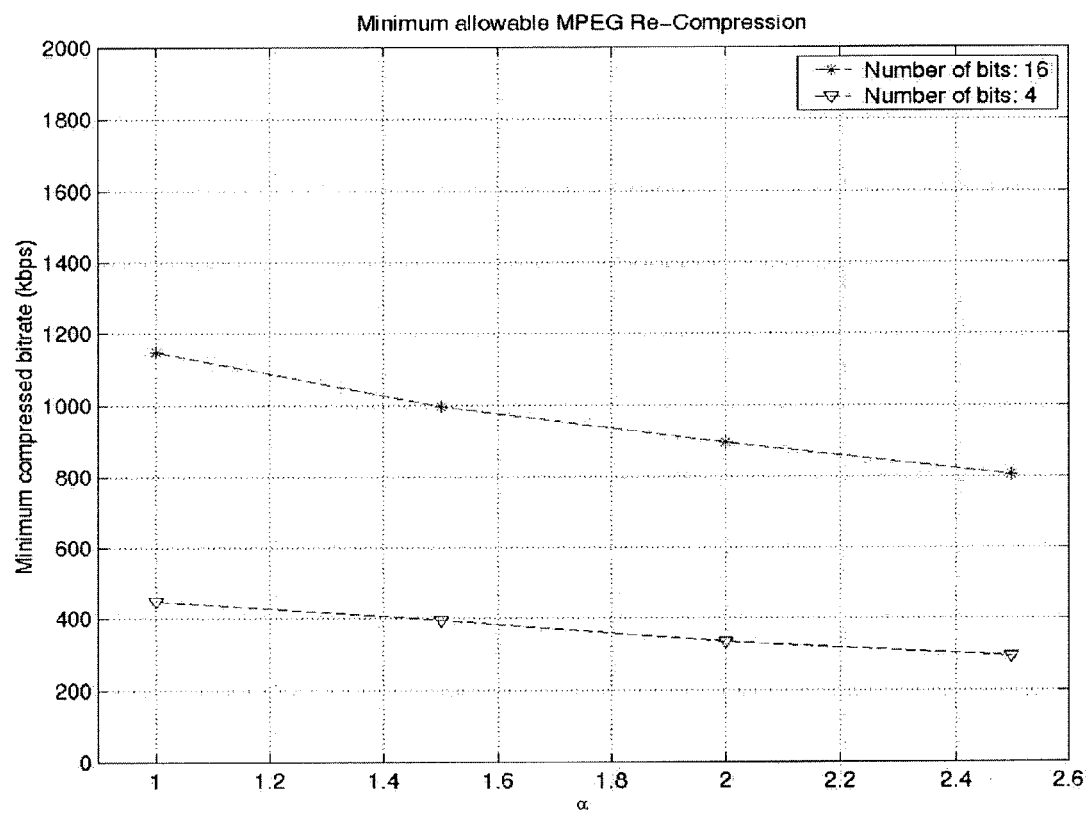
FIG. 8 is a graph that illustrates the minimum compressed bit rate of the MPEG stream such that a watermark can survive.
Figure 9:
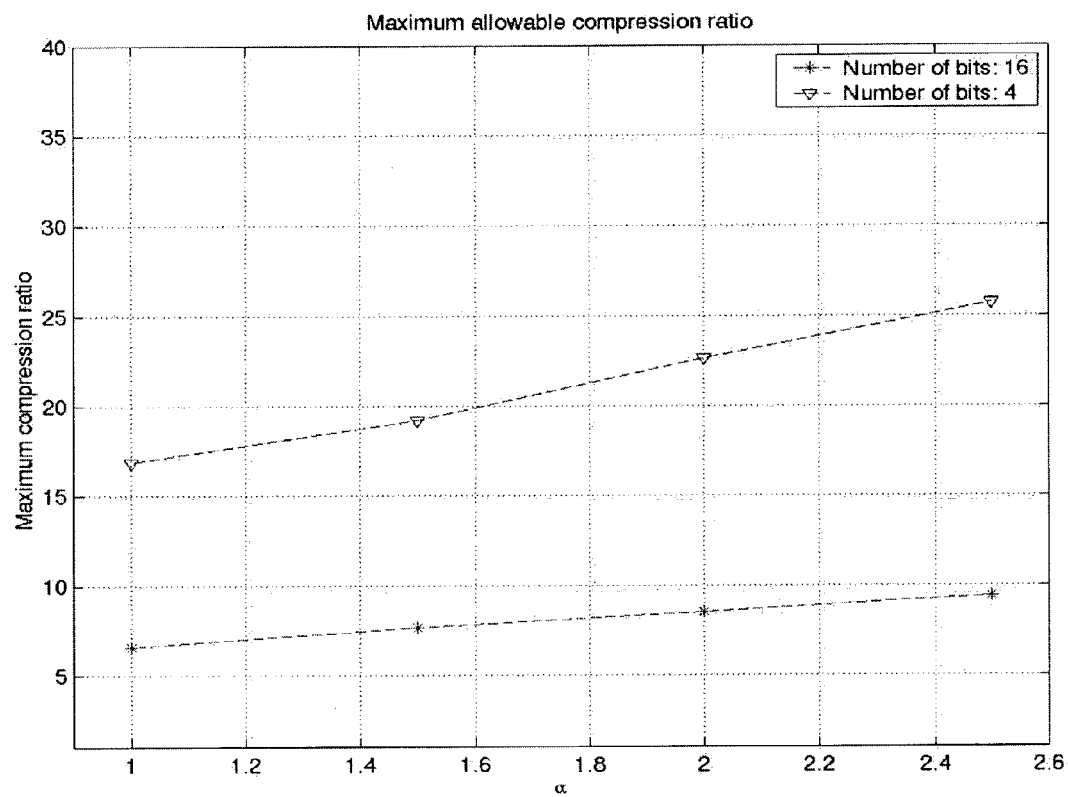
FIG. 9 is a graph that illustrates the maximum compression ratio of the MPEG re-compression that the watermark can tolerate.

FIG. 8 is a graph that illustrates the minimum compressed bit rate of the MPEG stream such that a watermark can survive, while FIG. 9 is a graph that illustrates the maximum compression ratio of the MPEG re-compression that the watermark can tolerate. In FIGS. 8 and 9, the watermark strength was varied with the different number of embedded watermark bits, and the results of the minimum bit rate of re-compression and the maximum compression ratio that a watermark can tolerate with no error introduced are provided.

5.3. Robustness Against Temporal Attacks

The local block-based feature selection is validated with these attacks in the time domain: (i) frame dropping, (ii) frame cropping, and (iii) frame averaging, and in the spatial domain: (i) sub-sampling and (ii) resizing, or size cropping.

Figure 10:
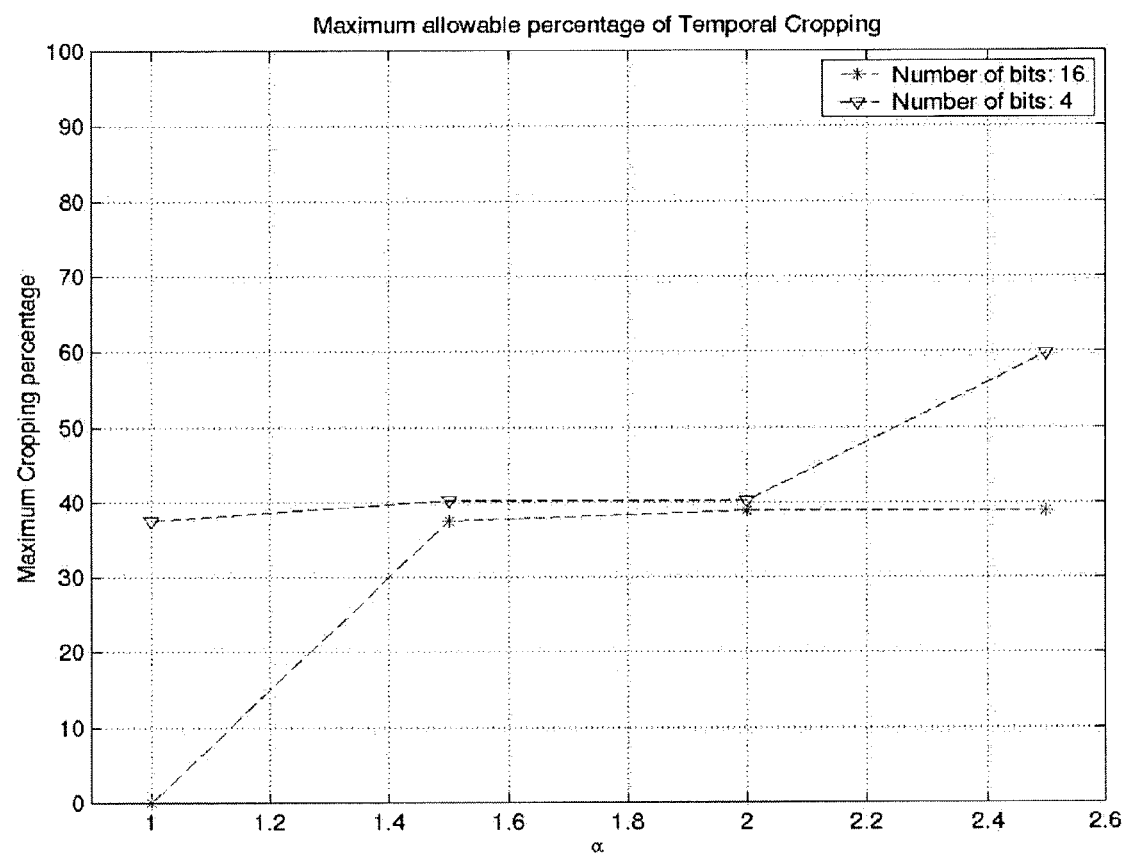
FIG. 10 is a graph illustrating the maximum cropping degree in time domain that the watermark can survive.

Frame cropping truncates the beginning and the end of each scene. In other words, video sequences are cut shorter by getting rid of the image frames in the beginning and the end. The proposed polyphase-based feature selection can tolerate up to 18-frames of cropping (12.5 percent of the scene length) while the PSNR is reduced to 36.64 dB. All the watermark bits can be recovered correctly. With the local block-based feature selection, as shown in FIG. 10, which is a graph illustrating the maximum cropping degree in time domain that the watermark can survive (cropping), the algorithm can impressively survive at a very high cropping length of up to 80%.

Figure 11:
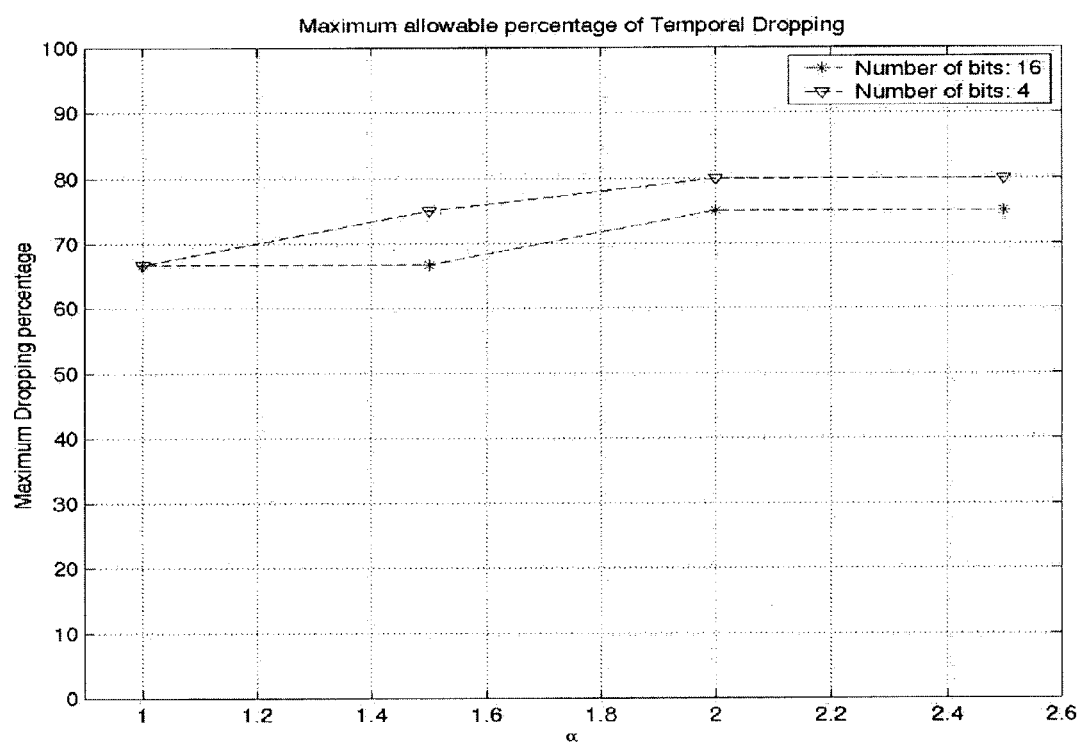
FIG. 11 is a graph illustrating the maximum dropping percentage in the time domain that the watermark can survive.

Frame dropping, or temporally sub-sampling the frames, can occur when the frame rate is changed. By using the polyphase-based feature selection, the present invention can detect all watermark bits correctly up to 80 percent of the scene length as shown in FIG. 11, which is a graph illustrating the maximum dropping percentage in the time domain that the watermark can survive, i.e., dropping 4 out of 5 frames. However, the visual quality performance is degraded to 29.35 dB. For frame dropping attack, the dropped frames were averaged with the frames available for reconstruction during the detection procedure and no watermark bit error was detected, which means that the proposed local feature-based algorithm cannot only tolerate the frame dropping or frame rate attack, but can also tolerate the frame averaging attack.

5.4. Robustness Against Spatial Attacks

Figure 12:
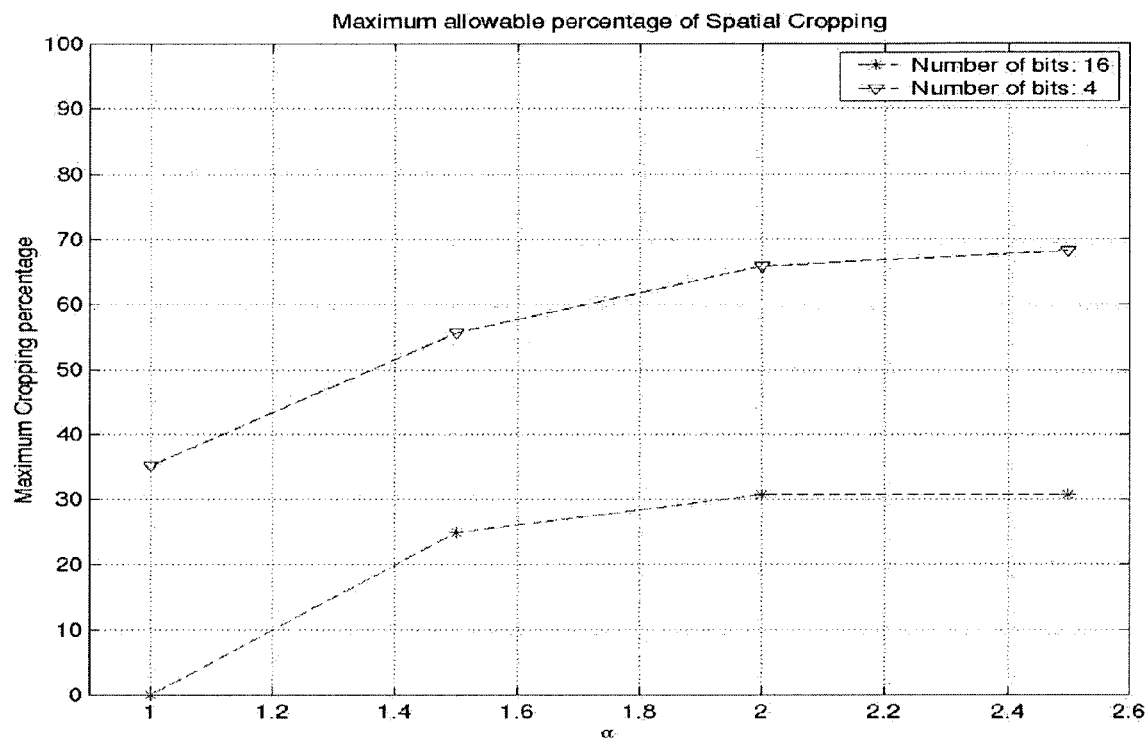
FIG. 12 is a graph illustrating the maximum cropping percentage in the spatial domain that the watermark can survive.

Spatial cropping spatially clips image rows or columns at the beginning or the end of the frame. For instance, a wide-screen digital video may need spatial cropping to fit into normal TV screens. The polyphase-based feature selection can not successfully survive this type of attack. However, as shown in FIG. 12, which is a graph illustrating the maximum cropping percentage in the spatial domain that the watermark can survive, the local block-based feature selection performs very well up to a high degree of image size cropping.

For spatial dropping or spatial sub-sampling, the images are sub-sampled along rows and columns. The polyphase-based feature selection can not resist this spatial attack; however, the local block-based feature selection can tolerate the sampling to ¼ of the original size. Due to the smaller size of the original video, only one sub-sampling was tested. For authentic digital videos, of course, there is much more room for a spatial dropping or spatial sub-sampling attack.

REFERENCES

The following references are incorporated by reference herein:

1. Ingemar, J. Cox, Joe Kilian, F. Thomson Leighton, and Talal Shamoon, Secure Spread Spectrum Watermarking for Multimedia, IEEE Transactions on Image Processing, Vol. 6, No. 12, December 1997

2. E. Koch, J. Rindfrey, and J. Zhao, "Copyright protection for multimedia data," In Proc. Int. Conf. Digital Media and Electronic Publishing, 1994

3. M.D. Swanson, B. Zhu, and A. H. Tewfik, "Multiresolution scene-based video watermarking using perceptual models," IEEE Journal on Selected Areas in Communications, Vol. 16, No. 4, pp. 540-550, May 1998.

4. W. Zhou, A. Vellaikal, Y. Shen, and C. C-Jay Kuo, "On-line scene change detection of multicast video," IEEE Journal of Visual Communication and Image Representation, March, 2001.

5. J. M. Shapiro, "Embedding image coding using zerotrees of wavelet coefficients," IEEE Trans. On Signal Processing, Special Issue on Wavelets and Signal Processing, 41(12): pp. 3445-3462, December 1993.

6. A. Said and W. A. Pealman, "A new fast and efficient image codec based on set partitioning in hierarchical trees," IEEE Trans. On Circuits and Systems for Video Technology, Vol. 6, No. 4, pp. 243-250, June 1996.

7. R. B. Wolfgang, C. I. Podilchuk, and E. J. Delp, "Perceptual watermarks for digital images and videos,"

Proceedings of the IEEE, Special Issue on Identification and Protection of Multimedia Information, Vol. 87, No. 7, pp. 1108-1126, July 1999.

CONCLUSION

This concludes the description of the preferred embodiment of the invention. The following describes some alternative embodiments for accomplishing the present invention. For example, different types of digital data, scene change detection, transformation and feature selection could be used with the present invention. In addition, different sequences of functions could be used than those described herein.

In summary, the present invention discloses a dynamic wavelet feature-based watermark for use with digital video. Scene change detection separates the digital data into one or more scenes, wherein each of the scenes is comprised of one or more frames. A temporal wavelet transformation decomposes the frames of each scene into dynamic frames and static frames. The static frames of each scene are subjected to a spatial wavelet transformation, so that the watermark can be cast into middle frequency sub-bands resulting therefrom. Polyphase-based feature selection or local block-based feature selection is used to select one or more features. The watermark is cast into the selected features by means of either (1) a comparison of energy in polyphase transform components of the selected feature, or (2) a change in value of blocked wavelet coefficients of the selected feature.

The foregoing description of the preferred embodiment of the invention has been presented for the purposes of illustration and description. It is not intended to be exhaustive or to limit the invention to the precise form disclosed. Many modifications and variations are possible in light of the above teaching.

What is claimed is:

1. A method of casting a watermark in digital data, comprising:
   (a) performing scene change detection to separate the digital data into one or more scenes, wherein each of the scenes is comprised of one or more frames;
   (b) performing a temporal wavelet transformation that decomposes the frames of each scene into dynamic frames and static frames;
   (c) performing a spatial wavelet transformation only on the static frames of each scene to generate a plurality of spatial sub-bands of the static frames;
   (d) selecting one or more features in one or more selected ones of the generated spatial sub-bands of the static frames; and
   (e) casting the watermark into the selected features.

2. The method of claim 1, further comprising extracting a Y component of a Y, U(Cb), V(Cr) digital data stream representing color components of digital video as the digital data for the scene change detection.

3. The method of claim 1, wherein the watermark is embedded in one or more middle frequency sub-bands resulting from the spatial wavelet transformation.

4. The method of claim 1, wherein the features are selected using a polyphase-based feature selection.

5. The method of claim 4, wherein the watermark is cast into the selected features by means of a comparison of energy in polyphase transform components of the selected feature.

6. The method of claim 1, wherein the features are selected using a local block-based feature selection.

7. The method of claim 6, wherein the watermark is cast into the selected features by means of a change in value of blocked wavelet coefficients of the selected feature.

8. The method of claim 1, wherein the watermark is cast across all frames in each scene.

9. The method of claim 1, further comprising performing a spatial wavelet reconstruction to reconstruct the static frames with the cast watermark of each scene.

10. The method of claim 9, wherein the spatial wavelet reconstruction comprises a spatial inverse-wavelet transformation.

11. The method of claim 9, further comprising performing a temporal wavelet reconstruction to recombine the dynamic frames with the static frames with the cast watermark to recreate each scene.

12. The method of claim 11, wherein the temporal wavelet reconstruction comprises a temporal inverse-wavelet transformation.

13. The method of claim 11, further comprising concatenating the recreated scenes and reinserting a Y component resulting therefrom into a Y, U(Cb), V(Cr) digital data stream representing the color components of the digital video.

14. An apparatus for casting a watermark in digital data, comprising:
   (a) means for performing scene change detection to separate the digital data into one or more scenes, wherein each of the scenes is comprised of one or more frames;
   (b) means for performing a temporal wavelet transformation that decomposes the frames of each scene into dynamic frames and static frames;
   (c) means for performing a spatial wavelet transformation only on the static frames of each scene to generate a plurality of spatial sub-bands of the static frames;
   (d) means for selecting one or more features in one or more selected ones of the generated spatial sub-bands of the static frames; and
   (e) means for casting the watermark into the selected features.

15. The apparatus of claim 14, further comprising means for extracting a Y component of a Y, U(Cb), V(Cr) digital data stream representing color components of digital video as the digits data for the scene change detection.

16. The apparatus of claim 14, wherein the watermark is embedded in one or more middle frequency sub-bands resulting from the spatial wavelet transformation.

17. The apparatus of claim 14, wherein the features are selected using a polyphase-based feature selection.

18. The appararus of claim 17, wherein the watermark is cast into the selected features by means of a comparison of energy in polyphase transform components of the selected feature.

19. The apparatus of claim 14, wherein the features are selected using a local block-based feature selection.

20. The apparatus of claim 19, wherein the watermark is cast into the selected features by means of a change in value of blocked wavelet coefficients of the selected feature.

21. The apparatus of claim 14, wherein the watermark is cast across all frames in each scene.

22. The apparatus of claim 14, further comprising means for performing a spatial wavelet reconstruction to reconstruct the static frames with the cast watermark of each scene.

23. The apparatus of claim 22, wherein the spatial wavelet reconstruction comprises a spatial inverse-wavelet transformation.

24. The apparatus of claim 22, further comprising means for performing a temporal wavelet reconstruction to recombine the dynamic frames with the static frames with the cast watermark to recreate each scene.

25. The apparatus of claim 24, wherein the temporal wavelet reconstruction comprises a temporal inverse-wavelet transformation.

26. The apparatus of claim 24, further comprising means for concatenating the recreated scenes and for reinserting a Y component resulting therefrom into a Y, U(Cb), V(Cr) digital data stream representing the color components of the digital video.

27. A method of detecting a watermark in digital data, comprising:
(a) performing scene change detection to separate the digital data into one or more scenes, wherein each of the scenes is comprised of one or more frames;
(b) performing a temporal wavelet transformation that decomposes the frames of the scene into dynamic frames and static frames;
(c) performing a spatial wavelet transformation only on the static frames to generate a plurality of spatial sub-bands of the static frames;
(d) selecting one or more features in one or more selected ones of the generated spatial sub-bands of the static frames; and
(e) detecting the watermark in the selected features.

28. The method of claim 27, further comprising extracting a Y component of a Y, U(Cb), V(Cr) digital data stream representing color components of digital video as the digital data for the scene change detection.

29. The method of claim 27, wherein the watermark is embedded in one or more middle frequency sub-bands resulting from the spatial wavelet transformation.

30. The method of claim 27, wherein the features are selected using a polyphase-based feature selection.

31. The method of claim 30, wherein the watermark is detected from the selected features by means of a comparison of energy in polyphase transform components of the selected feature.

32. The method of claim 27, wherein the features are selected using a local block-based feature selection.

33. The method of claim 32, wherein the watermark is detected from the selected features by means of a change in value of blocked wavelet coefficients of the selected feature.

34. The method of claim 27, wherein the watermark is cast across all frames in a scene.

35. The method of claim 27, further comprising iteratively performing steps (a)-(e) until all bits of the watermark in the static frames have been detected.

36. An apparatus for detecting a watermark in digital data, comprising:
(a) means for performing scene change detection to separate the digital data into one or more scenes, wherein each of the scenes is comprised of one or more frames;
(b) means for performing a temporal wavelet transformation that decomposes the frames of the scene into dynamic frames and static frames;
(c) means for performing a spatial wavelet transformation only on the static frames to generate a plurality of spatial sub-bands of the static frames;
(d) means for selecting one or more features in one or more selected ones of the generated spatial sub-bands of the static frames; and
(e) means for detecting the watermark in the selected features.

37. The apparatus of claim 36, further means for comprising extracting a Y component of a Y, U(Cb), V(Cr) digital data stream representing color components of digital video as the digital data for the scene change detection.

38. The apparatus of claim 36, wherein the watermark is embedded in one or more middle frequency sub-bands resulting from the spatial wavelet transformation.

39. The apparatus of claim 36, wherein the features are selected using a polyphase-based feature selection.

40. The apparatus of claim 36, wherein the watermark is detected from the selected features by means of a comparison of energy in polyphase transform components of the selected feature.

41. The apparatus of claim 36, wherein the features are selected using a local block-based feature selection.

42. The apparatus of claim 41, wherein the watermark is detected from the selected features by means of a change in value of blocked wavelet coefficients of the selected feature.

43. The apparatus of claim 36, wherein the watermark is cast across all frames in a scene.

44. The apparatus of claim 36, further comprising means for iteratively performing the means (a)-(e) until all bits of the watermark in the static frames have been detected.

* * * * *